June 2, 1964 G. M. HALLETT, JR., ETAL 3,135,820
FASTENING DEVICES FOR LINEMEN'S RUBBER BLANKETS
Filed Feb. 2, 1962
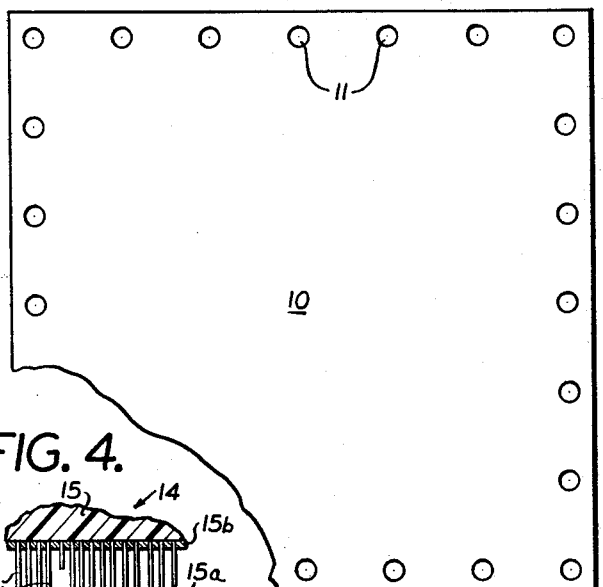
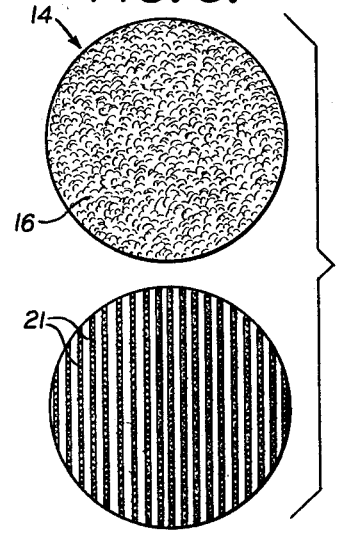
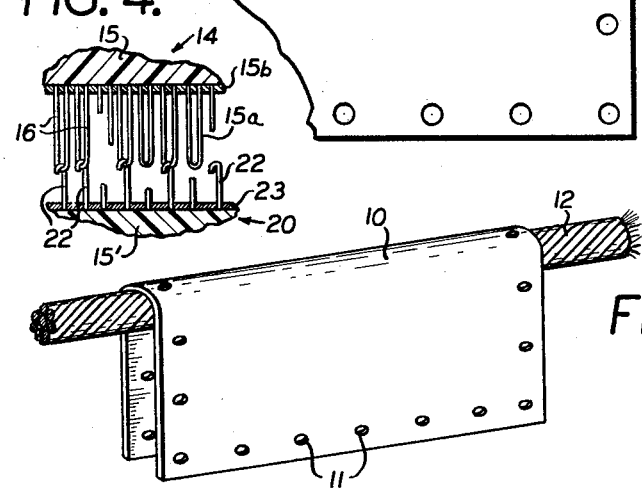
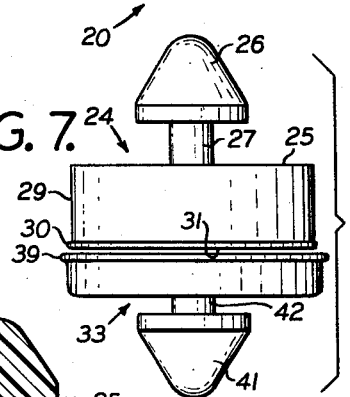
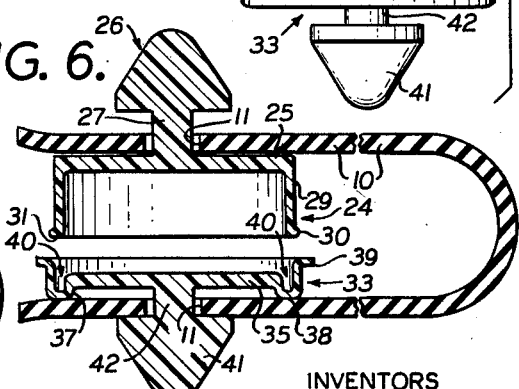
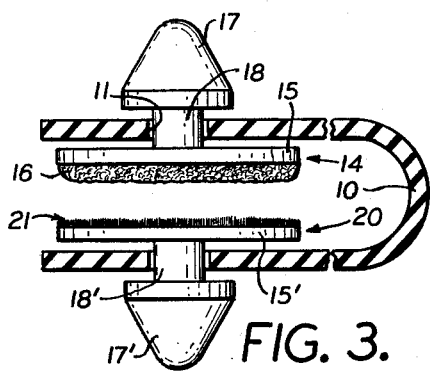
INVENTORS
GALEN M. HALLETT, JR.
JOHN J. KEILEN, JR.
BY Berry & Crews
ATTORNEYS.

United States Patent Office 3,135,820
Patented June 2, 1964

3,135,820
FASTENING DEVICES FOR LINEMEN'S RUBBER BLANKETS
Galen M. Hallett, Jr., and John J. Keilen, Jr., Charleston, S.C., assignors to Charleston Rubber Company, Charleston, S.C., a corporation of Ohio
Filed Feb. 2, 1962, Ser. No. 170,769
7 Claims. (Cl. 174—5)

The present invention relates to linemen's blankets and to fastening devices therefor. Linemen's blankets consist of pieces of molded rubber in sheet form having high dielectric strength, which are draped over live conductors, electric cutoff switches, transformers, or other current-carrying devices as a protection to linemen or others in the vicinity. Heretofore these blankets have been fastened into position by the use of friction tape which is wound around and around the blanket, or by the use of wooden clamps which pinch two edges of the blanket together around the conductor. It has also been proposed to secure adjacent folds of the blanket by the use of a pointed peg of wood or plastic insert through marginal holes in the blanket. All of these devices are cumbersome, especially since the lineman must secure the blanket in place while wearing heavy rubber and leather gloves.

A type of fastening device has now been devised which is characterized by great simplicity and ease of operation. In brief, the invention consists in providing a button of special type, one part of which is inserted in one fold of the blanket, while the other part is inserted in another fold thereof (both such operations being capable of being carried out on the ground); then when the blanket has been draped over the desired object, the two parts of the fastener may be brought together, and held together by means associated with said parts which are responsive to pressure for union, and to tension for separation. The pressure and tension responsive means may take various forms. In one preferred form with which this application is especially concerned, the means relied upon for this action consists of complementary surfaces, each having a rigid backing, one of which has a multiplicity of hooklike elements composed of plastic, springy material, while the other consists preferably of a nap fabric whose multiplicity of fibers are in the form of loops. Therefore, when the two surfaces are brought together, the hooklike elements of one engage the looplike fibers of the other, thus creating the desired union. When it is desired to separate the members, this is accomplished by applying tension by a prying action. These complementary surfaces per se are already known, and are disclosed in part in the patent to Mestral, 2,717,437.

Another preferred form is a fastening device based upon the principle employed in the so-called "Tupperware"—see Patent 2,487,400—consisting of a cup-like member upon which fits a cover-like member, one or both parts being made of polyethylene or plastic having similar properties. The parts are so contrived that they have a non-snap fit offering great resistance to separation by direct pull. However, separation is readily effected by a simple peeling operation starting at one point on the periphery of the cover.

The invention will be best understood by reference to the following detailed description, taken with the annexed drawings. in which—

FIG. 1 shows a lineman's blanket with the marginally aligned holes therein;

FIG. 2 shows it draped over a conductor;

FIG. 3 is an enlarged sectional view showing a fastening device in place with the parts disunited;

FIG. 4 is an enlarged view showing hooklike elements of one member intermeshed with the looped fibers of the nap fabric of the other member;

FIG. 5 is a view of the active surfaces of the two members;

FIG. 6 is an enlarged sectional view showing a further embodiment in place, but with the parts disunited; and FIG. 7 shows the fastening device as a unit.

In FIG. 1 the lineman's blanket 10 is provided with the usual marginally aligned holes 11, which may or may not be reinforced as desired. Referring to FIG. 3, the fastening means consists of a member 14 formed of a flat platelike element 15 to which is adhered a pile fabric 16 consisting of a multiplicity of looped fibers 15a (FIG. 4) of springy plastic material held in a ground or backing 15b, such fibers being thickly and randomly disposed as shown. Desirably the plate 15 is integral with button 17 having neck 18 which is adapted to penetrate the holes 11, and thus be held securely therein. The fabric 16 is adhered to the plate 15 by means of a suitable cement, not shown. Complementary member 20 has a surface 21 of a material consisting of hooklike elements 22 which are adapted to engage with the nap surface of member 14. Save for the latter, the member 20 is identical with member 14 and has button 17' and neck 18'. Springy hooklike elements 22 may be arranged in rows as shown in FIG. 5, and are held in a ground or backing 23 which is cemented to the face of member 20. When the active surfaces of members 14 and 20 are brought together with a slight degree of pressure, the hooklike elements 22 are caught and held in loops 15a of fabric 16. Members 14 and 20 may, however, be pulled apart, but only by the use of considerable force, if such force is applied directly and normal to the place of the active surfaces. Said members may, however, be separated by the use of a considerably less force by a prying action which causes a portion only of the engaged elements to separate at a time. When pulled apart, the tiny hooks 22 are caused to bend sufficiently to release the loops of the fibers 15a with which they had been engaged.

The improved fastening devices may be readily manufactured by molding the identical members 14 and 20, and integral buttons in a single piece and then cementing thereon the proper active surfaces.

In use, the buttons 17, 17' are readily inserted—due to their conical shape as shown—into the proper holes in the blanket 10 for the job at hand, preferably when the lineman is on the ground, thus making the actual union most easily effected above ground by a simple pressing together of the active surfaces.

It will be further noted that because the active surfaces 16 and 21 are maintained flatwise owing to their adherence to the flat, rigid, dislike surfaces of the members 14 and 20, any force applied through the buttons, and hence any force tending to separate the folds of the blanket will be almost entirely normal to said surfaces (the axis of necks 18, 18' being normal to members 14 and 20 respectively), whereby the greatest resistance to such force will be encountered. On the other hand, if the active surfaces were to be applied directly to the blanket 10, this result would not be had since the surfaces would be easily separated by a peeling action when a force was applied to separate the folds of the blanket. It will be further understood that the area of the surfaces 16 and 21 may be varied to give whatever separating force that may be desired when applied as a direct pull. In practice, the size shown in FIG. 5 of the drawing as filed, i.e., approximately two inches, has been found to be satisfactory.

Referring to the embodiment of FIGS. 6 and 7, the fastening means shown consists of a cuplike member 24 with a top 25 having integral therewith a button 26 and neck 27, the elements 24 to 27 desirably being molded in a single piece of polyethylene or other plastic having similar properties. The cylindrical portion of the cup element is formed by the wall 29 having preferably a bead 30 adjacent rim 31 thereof.

A complementary member 33 is formed, preferably of the same plastic as member 24, and in effect constitutes a cover for the cup member 24. It consist of a flat, central disk portion 35 around which is formed a groove as by means of a vertical flange 37, annular portion 38, and a flared circumferential wall 39, thereby forming a groove 40. Disk portion 35 also has integral therewith button 41 having neck 42. Desirably the inner diameter of the flared portion of the wall 39 is very slightly less than the greatest diameter of the bead 30 of the cup member, whereby the cover member undergoes an appreciable stretching when applied to the cup member. When so applied, the parts fit together with a nonsnap action. Normally the members 24 and 23 will have been affixed to the desired holes of the blanket by inserting the respective buttons through the desired holes 11 when the lineman is on the ground. As already stated, when the fastener members are united, it is practically impossible to remove them by direct pull; however, they are readily removed by a peeling action, as for example, by the use of the thumb of the right hand against a point on the flange 37 while holding the cup member 24 in the left hand.

One advantage of the embodiment just described is that each element of the fastening device per se may be molded in a single piece of the desired plastic. However, if desired, the buttons proper may be separately formed and secured to already formed attaching means shown, by suitable cement.

It will be understood that the invention may take other forms without departing from the spirit of the invention, or the scope of the appended claims.

We claim:
1. In combination, a lineman's insulating blanket, a fastening device for securing together opposing folds thereof, comprising
(a) a first fastening member having
(b) a rigidly supported non-magnetic active surface, attaching means in the form of button and buttonhole securing same to one of said folds, said attaching means permitting substantial freedom of movement of said first fastening member with respect to the blanket surface whereby random forces acting upon the blanket are substantially prevented from exerting a peeling action with respect to said active surfaces,
(c) a second fastening member having a rigidly supported non-magnetic active surface complementary to said active surface first mentioned, attaching means in the form of button and buttonhole securing same to said opposing fold of the blanket,
(d) said active surface last mentioned being capable of being united to said active surface first mentioned when said surfaces are pressed together, the union so formed resisting strongly a direct pull normal to said surfaces, but being readily broken when a force is applied to peel one of said surfaces from the other.

2. The combination according to claim 1, in which at least one of said active surfaces is removably secured to said blanket.

3. The combination according to claim 1, in which one of said active surfaces consists of a nap fabric having a multiplicity of looped fibers of springy plastic material, and the other of said active surfaces is composed of a multiplicity of hook-like elements which are adapted to intermesh with said looped fibers of said other member.

4. The combination according to claim 1 in which each of said buttons is integral with a rigid support for said active surfaces, and has a neck connecting the button proper and said support, the axis of said neck being substantially normal to the plane of the support.

5. The combination according to claim 1 in which the active surface of paragraph (b) consists of a deformable plastic cup, and in which the active surface of paragraph (d) consists of a deformable plastic cover having a base and side walls tightly fitting said cup in a non-snap fashion.

6. The combination according to claim 5 in which
(e) said side walls of said cover projecting upwardly from a level below said base and spaced therefrom to form a groove to accommodate the rim of said wall of the cup-like member,
(f) said cover member being of polyethylene or like plastic material having similar properties,
(g) the arrangement of the parts being such that a non-snap tight fit is had between said fastening members resulting in some distortion of said second fastening member, thereby causing said members to adhere together with considerable tenacity.

7. The combination according to claim 6 in which the portion of said first member engaged by said second member is composed of the same or similar plastic substance as said second member.

References Cited in the file of this patent
UNITED STATES PATENTS

| | | |
|---|---|---|
| 1,403,034 | Kingsbury | Jan. 10, 1922 |
| 2,206,471 | Taylor | July 2, 1940 |
| 2,487,400 | Tupper | Nov. 8, 1949 |
| 2,497,305 | Isaac et al. | Feb. 14, 1950 |
| 2,538,396 | Sutin | Jan. 16, 1951 |
| 2,717,437 | Mestral | Sept. 13, 1955 |